United States Patent
Buggenthin et al.

(10) Patent No.: US 11,360,467 B2
(45) Date of Patent: Jun. 14, 2022

(54) METHOD AND SYSTEM FOR DETECTION OF AN ABNORMAL STATE OF A MACHINE USING IMAGE DATA AND ARTIFICIAL INTELLIGENCE

(71) Applicant: SIEMENS AKTIENGESELLSCHAFT, Munich (DE)

(72) Inventors: Felix Buggenthin, Munich (DE); Tobias Jäger, Baiersdorf Igelsdorf (DE); Steffen Lamparter, Feldkirchen (DE); Michal Skubacz, Gröbenzell (DE); Ingo Thon, Grasbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 130 days.

(21) Appl. No.: 16/632,492

(22) PCT Filed: Jul. 17, 2018

(86) PCT No.: PCT/EP2018/069427
§ 371 (c)(1),
(2) Date: Jan. 20, 2020

(87) PCT Pub. No.: WO2019/016225
PCT Pub. Date: Jan. 24, 2019

(65) Prior Publication Data
US 2021/0089016 A1 Mar. 25, 2021

(30) Foreign Application Priority Data
Jul. 20, 2017 (EP) .................................... 17182322

(51) Int. Cl.
*G05B 23/02* (2006.01)
*G05B 19/406* (2006.01)
(Continued)

(52) U.S. Cl.
CPC ......... *G05B 23/024* (2013.01); *G05B 19/406* (2013.01); *G05B 23/0227* (2013.01);
(Continued)

(58) Field of Classification Search
None
See application file for complete search history.

(56) References Cited

U.S. PATENT DOCUMENTS

| 6,297,844 B1 | 10/2001 | Schatz |
| 2002/0003415 A1 | 1/2002 | Nakai |

(Continued)

OTHER PUBLICATIONS

Rozantseva et al. 'On rendering synthetic images fortraining an object detector' Computer Vision and Image Understanding 137 (2015) 24-37.*

(Continued)

*Primary Examiner* — Bernard G Lindsay
(74) *Attorney, Agent, or Firm* — Lempia Summerfield Katz LLC

(57) ABSTRACT

An object recognition apparatus for automatic detection of an abnormal operation state of a machine including a machine tool operated in an operation space monitored by at least one camera configured to generate camera images of a current operation scene is provided. The generated camera images are supplied to a processor configured to analyze the current operation scene using a trained artificial intelligence module to detect objects present within the current operation scene. The processor is also configured to compare the detected objects with objects expected in an operation scene in a normal operation state of the machine to detect an abnormal operation state of the machine.

15 Claims, 5 Drawing Sheets

(52) U.S. Cl.
CPC .............. *G05B 2219/32335* (2013.01); *G05B 2219/33025* (2013.01); *G05B 2219/35012* (2013.01); *G05B 2219/37572* (2013.01)

(56) References Cited

U.S. PATENT DOCUMENTS

| | | | |
|---|---|---|---|
| 2004/0030440 A1* | 2/2004 | Murai | B23H 7/065 |
| | | | 700/162 |
| 2006/0092274 A1 | 5/2006 | Good | |
| 2006/0096726 A1 | 5/2006 | Ahvenainen | |
| 2010/0000320 A1* | 1/2010 | Shao | G01M 1/24 |
| | | | 73/487 |
| 2014/0079314 A1* | 3/2014 | Yakubovich | G06K 9/6227 |
| | | | 382/159 |
| 2015/0217455 A1 | 8/2015 | Kikkeri | |
| 2016/0207157 A1* | 7/2016 | Corletto | B23Q 3/15722 |
| 2017/0165803 A1* | 6/2017 | Nakayama | B25J 9/1697 |
| 2018/0113434 A1* | 4/2018 | Shapiro | G05B 19/406 |
| 2018/0276501 A1* | 9/2018 | Yamada | G06K 9/2027 |

OTHER PUBLICATIONS

European Search Report for European Patent Application No. 17182322.2-1205 dated Jan. 18, 2018.
PCT International Search Report and Written Opinion of International Searching Authority dated Oct. 16, 2018 corresponding to PCT International Application No. PCT/EP2018/069427 filed Jul. 17, 2018.

\* cited by examiner

METHOD AND SYSTEM FOR DETECTION OF AN ABNORMAL STATE OF A MACHINE USING IMAGE DATA AND ARTIFICIAL INTELLIGENCE

This application is the National Stage of International Application No. PCT/EP2018/069427, filed Jul. 17, 2018, which claims the benefit of European Patent Application No. EP 17182322.2, filed Jul. 20, 2017. The entire contents of these documents are hereby incorporated herein by reference.

BACKGROUND

The present embodiments relate to detection of an abnormal state of a machine including a machine tool.

A machine such as a production machine or a manufacturing machine of a facility may include one or several machine tools adapted to process workpieces. A machine tool is normally operated under control of a numerical control program executed by a command module or local controller of the machine. The numerical control program precisely specifies commands that the machine tool is executing. In a conventional machine, the machine controller executes the numerical control program blindly once the numerical control program has been started or initiated. However, it is possible, for example, after a maintenance process, that alien objects such as a screwdriver remain in the operation chamber of the machine and remain unobserved when starting the numerical control program of the machine. In this case, the foreign or alien object may disrupt the production process and even damage the machine and/or the workpiece processed by the machine tool of the machine. Further, it is possible that an incorrect raw working piece is to be processed by the machine, which results in an unintended production result. Conventional production machines may use specific sensors for detecting obstacles or alien objects in a predefined area. These sensors may include additional cameras used for detection of alien objects or for detection of misalignments of workpieces relative to the machine tool. However, these conventional approaches do not work robustly if the process changes. A process change in the manufacturing process often takes place for small-batch-size production scenarios where the presence and alignment of a specific object is to be verified.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and a system that improve the robustness and reliability for small-batch production scenarios with regular process changes are provided.

According to a first aspect, a method for detection of an abnormal state of a machine including a machine tool is provided. The method includes receiving camera images of a current operation scene of the machine tool by an operation scene analyzer using a trained artificial intelligence module to detect objects present within the current operation scene. The method also includes comparing continuously or at specific time points in a control program the objects detected within the current operation scene with objects expected in an operation scene in a normal operation state of the machine to detect an abnormal operation state of the machine.

In a possible embodiment of the method according to the first aspect, the machine is automatically controlled depending on the detected operation state of the machine.

In a further possible embodiment of the method according to the first aspect, the camera images are generated by at least one camera by monitoring a machine tool operation within a tool operation space where the machine tool of the machine is operated under control of a controller according to the detected operation state of the machine.

In a possible embodiment of the method according to the first aspect, several cameras (e.g., a plurality of cameras) monitor the machine tool operation space from different points of view and supply the generated camera images representing the current operation scene to the operation scene analyzer using the trained artificial module for operation state detection.

In a further possible embodiment of the method according to the first aspect, the artificial intelligence module is trained with a dataset of operation scene images tagged with different operation states of the machine.

In a further possible embodiment of the method according to the first aspect, the operation states of the machine include a normal operation state and at least one abnormal operation state of the machine including the presence of at least one alien or unidentified object within the operation space, an alien or unidentified workpiece to be processed by the machine tool, and/or a wrong relative position between the machine tool and a workpiece within the operation space.

In a further possible embodiment of the method according to the first aspect, the operation scene images used to train the artificial intelligence module are read from an image database and supplied to a model builder entity that trains the artificial intelligence module used by the operation scene analyzer.

In a further possible embodiment of the method according to the first aspect, the trained artificial intelligence module includes a trained deep neural network including a deep convolutional neural network or a recurrent neural network.

In a further possible embodiment of the method according to the first aspect, the artificial intelligence module includes a decision tree and/or a random forest.

In a still further possible embodiment of the method according to the first aspect, the artificial intelligence module includes a support vector machine.

In a further possible embodiment of the method according to the first aspect, the objects expected in the operation scene during a normal operation state of the machine are derived using a CAD model and/or a CAM program stored in a memory.

In a still further possible embodiment of the method according to the first aspect, prior to the operation of the machine, an image generator retrieves a 3D model for each potential workpiece and/or for each potential alien object and renders the retrieved 3D into operation scene images read from an image database to provide operation scene images for different operation scenes used by the model builder entity to train the artificial intelligence module. The image database stores images showing an empty machine operation space.

In a further possible embodiment of the method according to the first aspect, the machine is controlled to perform automatically mitigating actions and/or countermeasures and/or is automatically stopped if an abnormal operation state of the machine is detected by the operation state analyzer.

The present embodiments provide, according to the second aspect, an object recognition apparatus for automatic detection of an abnormal operation state of a machine including a machine tool operated in an operation space monitored by at least one camera. The at least one camera is adapted to generate camera images of a current operation scene. The generated camera images are supplied to a processor adapted to analyze the current operation scene using a trained artificial intelligence module to detect objects present within the current operation scene. The processor is further adapted to compare the detected objects with objects expected in an operation scene in a normal operation state of the machine to detect an abnormal operation state of the machine.

In a possible embodiment of the apparatus according to the second aspect, the processor is configured to control the machine (e.g., the machine tool), in response to the detected operation state of the machine.

In a possible embodiment of the apparatus according to the second aspect, the machine tool of the machine is operated under control of the processor in a closed operation chamber of the machine defining the operation space monitored by the at least one camera to process a workpiece within the operation chamber.

DETAILED DESCRIPTION

Figure 1:
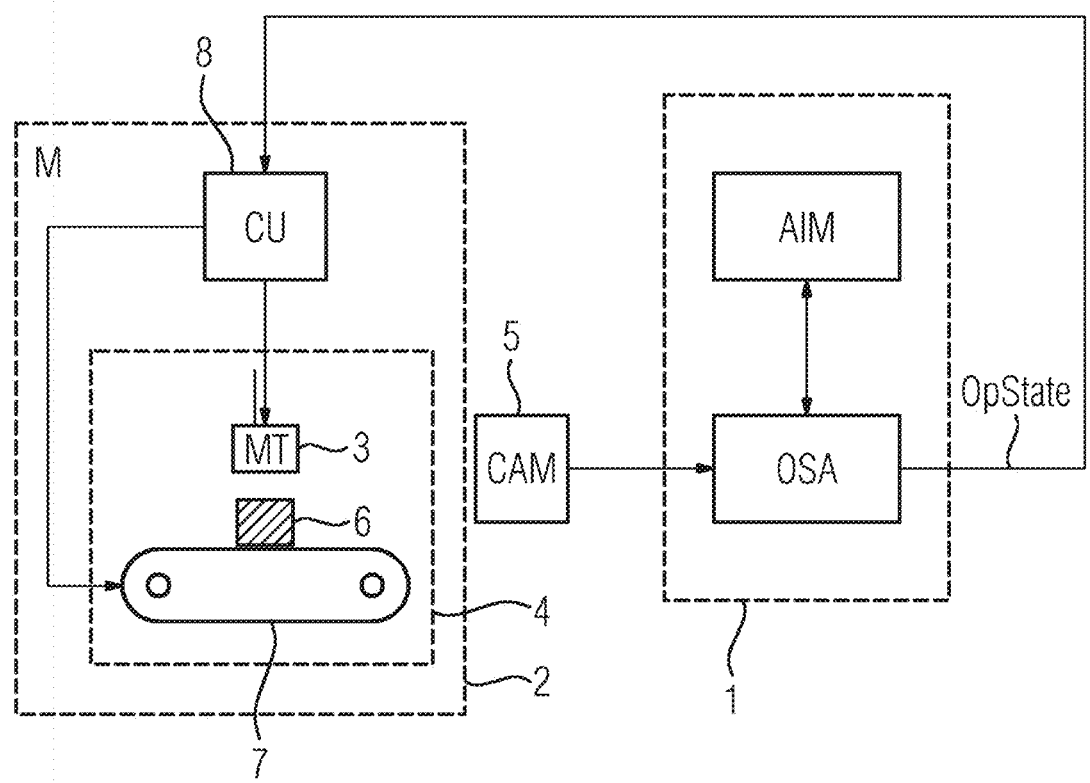
FIG. 1 shows a block diagram for illustrating a possible exemplary embodiment of an object recognition apparatus.

As shown in FIG. 1, an object recognition system or apparatus according to an aspect of the present embodiments may be used for automatic detection of at least one abnormal operation state of a machine (e.g., a production or manufacturing machine including at least one machine tool operated in an operation space that may be monitored by at least one camera generating camera images of a current operation scene). In the illustrated embodiment of FIG. 1, an object recognition apparatus 1 is used for automatic detection of an operation state of a machine 2 having at least one machine tool 3 operated in a predefined operation space 4 that is monitored by at least one camera 5. The camera 5 generates camera images of a current operation scene within the predefined operation space 4. The operation space 4 may be defined by a closed machine tool operation chamber where the machine tool 3 is operated to process a workpiece 6, as shown in the schematic diagram of FIG. 1. In the illustrated schematic diagram, the workpiece 6 may be transported by a conveyor belt 7 during processing of the workpiece 6. In the illustrated embodiment of FIG. 1, the processing machine 2 includes a local machine controller 8 having at least one microprocessor adapted to control the operation of the machine tool 3 and/or the movement of the transport facility 7 transporting the workpiece 6 processed by the machine tool 3. The machine tool 3 may be, for example, a milling machine tool or the like. The machine tool 3 may include any kind of machine tool adapted to process a workpiece 6. The machine tool 3 may be, for example, a cutting machine tool, a bending machine tool, or other machine tools for processing or transforming the workpiece 6.

The foreign object recognition or detection system may also be used in additive manufacturing machines.

The operation space 4 is monitored or observed by at least one camera 5. In a possible embodiment, camera images are generated by the at least one camera 5 by monitoring the machine tool operation space 4 within the tool operation chamber where the machine tool 3 is operated under control of the machine controller 8 according to a current detected operation state of the machine 2. In one embodiment, a plurality of cameras 5 monitor the machine tool operation space 4 from different points of view and may supply the generated camera images representing a current operation scene to the apparatus 1. The object recognition apparatus 1 includes, in the illustrated embodiment of FIG. 1, a processor having an operation scene analyzer OSA adapted to analyze the current operation scene using a trained artificial intelligence module AIM to detect objects present within the current operation scene. The processor of the object recognition apparatus 1 is further adapted to compare the detected objects with objects expected in an operation scene during a normal operation state of the machine 2 to detect deviating abnormal operation states of the machine 2 automatically.

In the illustrated exemplary embodiment of FIG. 1, the object recognition apparatus 1 may supply the detected operation state via an interface to the machine control unit 8 of the manufacturing machine 2. The supplied operation state may include a detected abnormal operation state of the machine 2. The controller 8 may control the machine 2 depending on the received detected operation state of the machine 2. If the detected operation state is a normal operation state, a numerical control program may be further executed by the machine controller 8 to process the workpiece 6 by the machine tool 3. In contrast, if the detected operation state of the machine provided by the object recognition apparatus 1 deviates from the normal operation state, the machine 2 is controlled under control of the machine controller 8 to perform countermeasures or mitigating measures to reduce the impact of the observed abnormal operation state on the production or manufacturing process performed by the machine tool 3.

In a possible embodiment, the artificial intelligence module AIM may be trained with a dataset of operation scene images tagged with different operation states of the machine 2. In a possible embodiment, the operation scene analyzer OSA is adapted to detect different operation states including at least one normal operation state of the machine and including at least one abnormal operation state of the machine. Abnormal operation states may, for example, include the presence of at least one alien or unidentified object such as a screwdriver within the operation space 4, an alien or unidentified workpiece to be processed by the machine tool 3, and/or a wrong relative position between the machine tool 3 and the workpiece 6 within the operation space 4 or a wrong absolute location of the workpiece 6 within a predefined coordinate system of the operation space 4. In a possible embodiment, the operation scene images used to train the artificial intelligence module AIM of the object recognition apparatus 1 are read from an image database and supplied to a model builder entity that may train the artificial intelligence module AIM used by the operation scene analyzer OSA of the object recognition apparatus 1. The trained artificial intelligence module AIM illustrated in FIG. 1 may include a trained deep neural network including a trained deep convolutional neural network CNN and/or a trained recurrent neural network RNN. In an alternative embodiment, the artificial intelligence module AIM used by the operation scene analyzer OSA of the recognition apparatus 1 may also include a decision tree and/or a random forest. In a still further possible embodiment, the artificial intelligence module AIM used by the operation scene analyzer OSA of the recognition apparatus 1 may also include a support vector machine. In a further possible embodiment of the object recognition apparatus 1, objects expected in the operation scene during a normal operation state of the machine 2 are derived using a CAD model and/or a CAM program stored in a local memory. The objects that may be detected by the object recognition apparatus 1 include physical objects (e.g., alien or foreign objects that may influence the production process negatively). In a possible embodiment of the object recognition apparatus 1, as illustrated in FIG. 1, prior to the operation of the machine 2, an image generator may retrieve a three-dimensional model for each potential workpiece 6 and/or for each potential alien object and render the retrieved three-dimensional models into operation scene images read from an image database. The image database stores camera images showing an empty machine operation space 4. Operation scene images are thus provided for different potential operation scenes used by the model builder entity to train the artificial intelligence module AIM.

Figure 2:
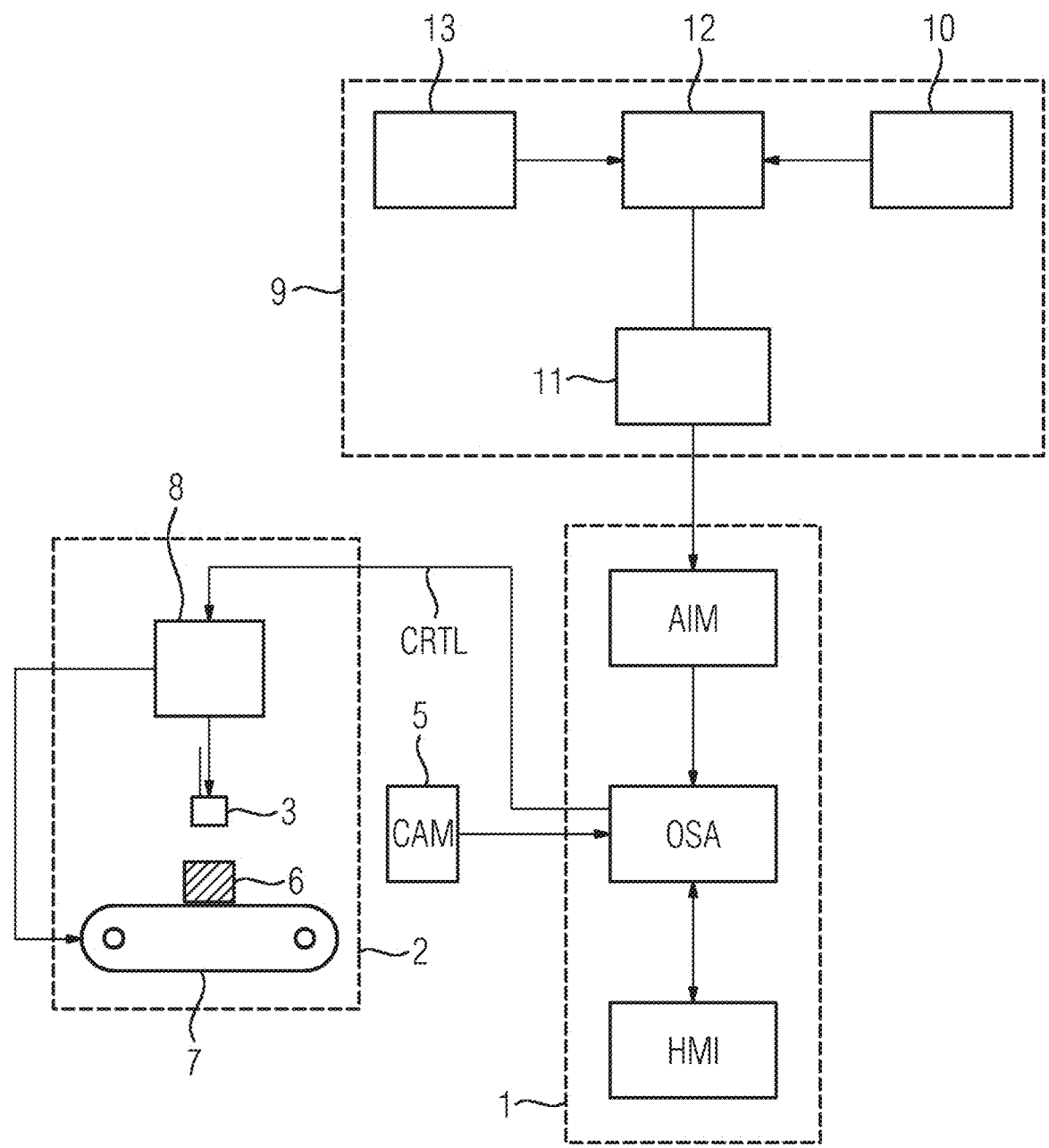
FIG. 2 shows a block diagram of a further possible exemplary embodiment of an object recognition apparatus.

FIG. 2 shows a possible further exemplary embodiment of an object recognition apparatus 1 according to an aspect of the present embodiments. In the illustrated embodiment of FIG. 2, the object recognition apparatus 1 used for operation state recognition of operation states within a processing machine 2 having a machine tool 3 for processing a workpiece 6 also includes, besides the operation state analyzer OSA and the artificial intelligence module AIM, an interface (e.g., an HMI interface for a user).

As also illustrated in the embodiment of FIG. 2, the artificial intelligence module AIM is trained prior to the operation of the machine 2 by a training system 9. In a possible embodiment, the artificial intelligence module AIM of the apparatus 1 is trained with a dataset of operation scene images tagged with different operation states of the machine 2. In a possible embodiment, operation scene images used to train the artificial intelligence module AIM may be read from an image database 10 and supplied to a model builder entity 11 that trains the artificial intelligence module AIM used by the operation scene analyzer OSA. In a possible implementation, prior to the operation of the machine 2, an image generator 12 may retrieve a 3D model for each potential workpiece 6 and for each potential alien object, and may render the retrieved three-dimensional models into operation scene images read from the image database 10. These operation scene images may include images showing an empty machine operation space 4. By rendering the retrieved 3D models of the potential workpieces 6 and/or potential alien objects into the empty operation scene images, it is possible to generate operation scene images for different operation scenes that may be used by the model builder entity 11 to train the artificial intelligence module AIM. The trained artificial module AIM may be implemented as a deep neural network trained by the model builder entity 11 of the training system 9 before starting operation of the machine 2. The trained deep neural network used by the operation state analyzer OSA includes in an embodiment a deep convolutional neural network CNN or a recurrent neural network RNN.

FIGS. 3, 4, 5, 6 illustrate schematically different possible operation states of the manufacturing machine 2 including a machine tool 3 within an operation chamber or operation space 4. The machine tool 3 is operated in the operation chamber of operation space 4 under control of a machine controller to process at least one workpiece 6 that may be moved within the operation space 4 (e.g., by a conveyor belt 7 as illustrated in the figures). At least one camera 5 may take pictures or generate camera images illustrating operation scenes, as shown in FIGS. 3 to 6. In the operation scene shown in FIG. 3, the machine 2 is in a normal operation state (e.g., a correct workpiece 6 is located at the correct position with respect to the machine tool 3 for processing).

Figure 4:
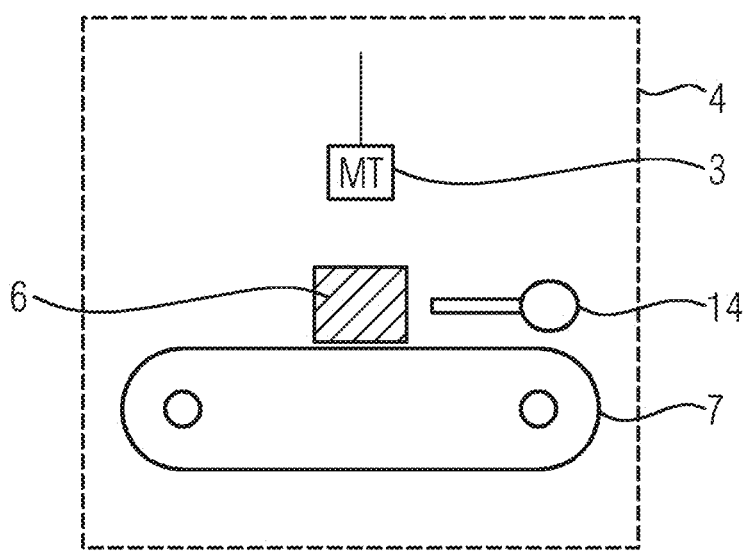
Figure 5:
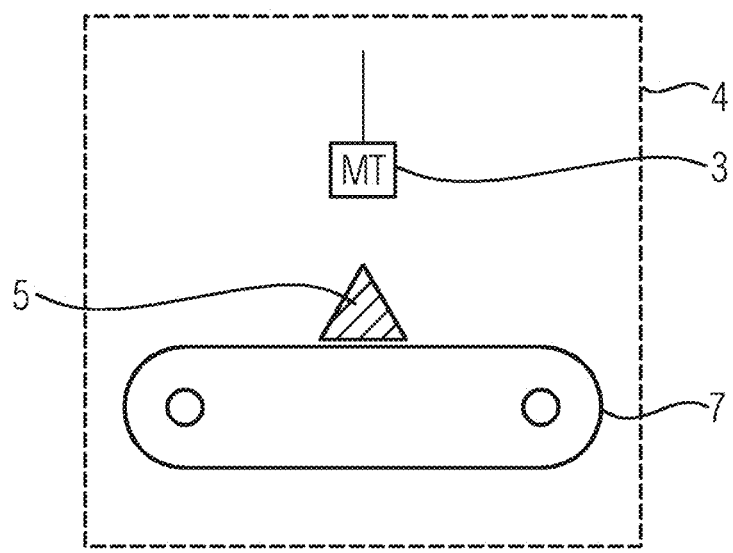
Figure 6:
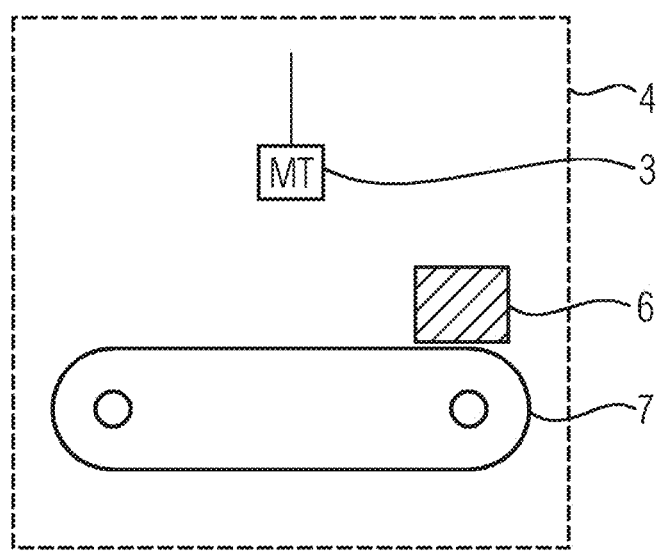

FIGS. 4, 5, and 6 illustrate different possible abnormal operations states of the machine 2. In the operation scene shown in FIG. 4, a correct workpiece 6 is positioned at a correct location; however, an alien unidentified object 14 is located in the vicinity of the workpiece 6. The unidentified object 14 may, for example, include a screwdriver forgotten by a maintenance technician within the operation chamber 4.

FIG. 5 illustrates a further operation scene representing an abnormal operation state of the machine 2. In the illustrated operation scene of FIG. 5, a wrong workpiece 15 is placed on the conveyor belt 7. In the illustrated example of FIG. 5, the wrong workpiece 15 may include a different shape and/or a different material than the correct workpiece 6 to be processed by the machine tool 3.

Figure 3:
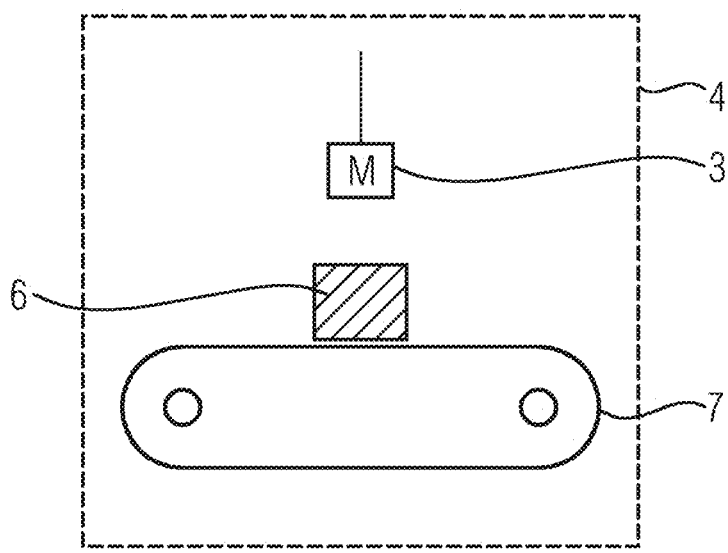
FIGS. 3 to 6 show schematically possible operation states detected by the object recognition apparatus.

FIG. 6 shows a further operation scene representing an abnormal operation state. In the illustrated operation state, a correct workpiece 6 is positioned in a wrong relative position with respect to the machine tool 3 deviating from the correct position, as illustrated in FIG. 3.

Accordingly, there may be different types of abnormal operation situations or operation states. There may also be combinations of different operation scenes or abnormal operation states, as illustrated in FIGS. 4, 5, and 6. For example, a wrong workpiece 15 may be placed at a wrong position, as illustrated in FIG. 6, and additionally, a foreign object 14 may also be placed on the conveyor belt forming the transporter 7 for the workpiece 6. The abnormal operation states represented by the abnormal operation scenes of FIGS. 4, 5, and 6 are states where the processing of the machine tool 3 shall not be started. In the first abnormal operation scene of FIG. 4, an alien or foreign object 14 like an assembling tool or assembling aid, or any other kind of foreign object is detected by the recognition apparatus 1. In the second abnormal operation scene illustrated in FIG. 5, an incorrect raw working piece 6 is placed in the operation space 4. In the third abnormal operation scene, the working piece 6 is mounted or located at a wrong position. The operation scenes or operation situations, as illustrated in FIGS. 5, 6, are relevant for job shoppers with lot size 1 production. Prior to production, the raw workpiece 6 that matches the program is to be loaded in the production machine. Further, in the proposed system, it is possible to detect when the workpiece 6 has not been properly aligned with the machine tool 3, as illustrated in FIG. 6.

In the first abnormal situation operation scene, as illustrated in FIG. 4, the alien object 14 placed in the workspace 4 of the machine tool 3 may even destroy the machine tool 3 and/or, for example, moving components of the machine tool 3, such as a spindle. Further, if an incorrect raw workpiece 15 has been loaded in the operation chamber 4 of the machine tool 3, as illustrated in FIG. 5, the incorrect raw workpiece 15 may interfere with the operation path of the machine tool 3 (e.g., because the incorrect raw workpiece 15 is larger than the correct workpiece 6). If, for example, a cutting machine tool is executing a rapid positioning and hits parts of the raw workpiece 15, this may lead to a serious damage of the machine 2. If a material of a workpiece to be processed is harder than expected, the machine tool 3 may be damaged when executing the workpiece processing program. Finally, even if the machine tool 3 is not damaged, the final product made from an incorrect workpiece 15 or from a misaligned correct workpiece 6 may not have the required properties (e.g., desired hardness, durability, weight, form, or other properties). The recognition apparatus 1 provides for a situation- or condition-based machine control of a machine 2 using a trained artificial intelligence module AIM.

In a possible embodiment, images are generated from 3D models to be used in object detection by the apparatus 1. In an alternative embodiment, a 3D model is reconstructed from images and matched with a three-dimensional scene description. In a possible embodiment, the cameras 5 of the object recognition apparatus 1 may monitor the operation chamber 4 of the machine 2 where the machine tool 3 is operated. It is also possible to use other imaging devices that generate images of the operation chamber 4 prior to executing the NC control program. The operation scene analyzer OSA of the apparatus 1 is adapted to automatically compare the set of images (e.g., representing the current operation state of the machine 2 with a database of image sets representing a predefined group of abnormal operation states such as the three abnormal operation states illustrated in FIGS. 4, 5, and 6). The system decides autonomously which operation state applies best and may automatically trigger mitigating actions or countermeasures or stop the processing of the workpiece 6. The cameras 5 take images of the machine tool operation chamber 4, potentially of different modality (e.g., true-color, infrared, depth, etc.). In addition, several cameras 5 or other imaging devices may monitor the operation chamber 4 from different points of view (e.g., one camera on every side of the operation chamber 4).

In one embodiment, the image generator 12 may build an image database used to train the artificial intelligence module AIM used by the operation scene analyzer OSA. This may be based on a database of images showing an empty operation chamber 4 and a repository (e.g., a memory containing 3D CAD models of workpieces and possible potential alien objects 4 such as a screwdriver or a plier). For every possible situation (e.g., different workpieces and/or alien objects at different positions in the chamber 4), images are created by virtually arranging 3D models in the operation chamber images (e.g., by raytracing technology).

The artificial intelligence module AIM is trained with a dataset of images that may be tagged with one of the different normal or abnormal operation states until the artificial intelligence module AIM is able to assign these operation states to new and unseen image sets. For example, a deep convolutional network (e.g., Google Inception v3) may be trained to detect whether an alien object 14 resides in the operation chamber 4 or not. A different deep neural network (e.g., CRF RNN) may be trained to detect a mounted workpiece 6 in the image and construct a virtual 3D representation from the detected mounted workpiece 6. The artificial intelligence module AIM may take as input a raw image (e.g., in jpg or png format) and may not require any preprocessing such as computation of features. The output may be a scalar value between 0 and 1 indicating a probability for alien object detections or a three-dimensional matrix with probability values between 0 and 1 that may describe a segmented object in a three-dimensional space (e.g., working piece detection).

The operation scene analyzer OSA of the apparatus 1 uses the artificial intelligence module AIM defined by the model builder entity 11 that may be integrated into a machine tool core firmware of built into an add-on processing unit (e.g., SINUMERIC Edge that may be attached to the machine 2 via an interface connection). Based on the received new camera images from the state monitoring device, the system may decide whether an alien object 14 resides in the operation chamber or workspace 4. The system may compare the extracted three-dimensional model of a mounted workpiece 6 to a three-dimensional model of an intended workpiece and evaluates whether those models are the same.

The system 1 may stop in a possible embodiment the operation of the machine 2. The HMI interface of the apparatus 1 may provide an override functionality. The interface HMI may provide a feedback to a human operator explaining (e.g., why the machine 2 has not been started). The interface 1 may be, for example, a graphical user interface where detected objects may be highlighted in a camera image and displayed to the human operator.

In a training phase, the training system 9 is used to train the artificial intelligence module AIM of the apparatus 1. An image generator 12 may retrieve a three-dimensional module (e.g., from Teamcenter or the MindSphere Cloud) and may render the three-dimensional module at different locations into the scene images. In a possible embodiment, for workpieces 6, the images may be categorized into two main categories (e.g., a workpiece at the right location and a workpiece at an incorrect location). An alien object may in addition be rendered in different sizes so that larger and smaller objects of the same shape may be detected as well. This process may be repeated for each of the available 3D models. On the generated images, an artificial intelligence module AIM may be built and trained by the model builder 11 of the training system 1. The artificial intelligence module AIM may form a multi-class/multi-instance classifier. This may be used to detect which of the objects is present in the current operations scene. This process is possible if a limited number of 3D models are to be detected.

Prior to starting the machine 2, an image of the operation scene may be taken. This camera image is then sent to the operation scene analyzer OSA of the apparatus 1. The operation scene analyzer OSA is using the trained artificial intelligence module or AI module built by the model builder in the previous phase to detect which objects are present in the operation scene. The objects present in the operation scene are compared with respective objects which may be specified using a CAD model or a CAM program. In addition, the location of the objects may be verified. In case that the expected objects and the detected objects do not match, the apparatus 1 may instruct the command module 8 of the machine 2 to stop executing the machine processing program.

In the second variant or approach, a three-dimensional model is reconstructed from images and matched with a 3D operation scene description. In this variant, both training phases are executed for each workpiece 6. This may be provided for lot size 1 production. The model of the operation scene analyzer OSA is built specifically to detect only a raw workpiece expected for the current production step. Prior to starting the workpiece processing step, the 3D model is retrieved, and a set of training images is built.

Based on these images, a classifier or artificial intelligence module AIM that is then used to check the current camera image is built.

Figure 7:
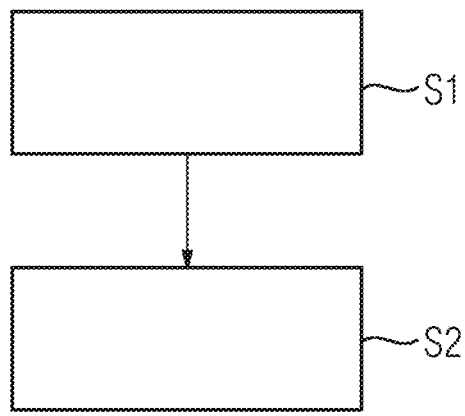
FIG. 7 shows a flowchart of a possible exemplary embodiment of a method for detection of an abnormal operation state of a machine.

FIG. 7 shows a flowchart of a possible exemplary embodiment of a method. In the illustrated embodiment, the method for detecting an abnormal state of a machine 2 including a machine tool 3 includes two main acts. In a first act S1, camera images of a current operation scene of the machine tool 3 are received by an operation scene analyzer OSA using a trained artificial intelligence module AIM to detect objects present within the current operation scene.

In a second act S2, the objects detected within the current operation scene are compared with objects expected in the operation scene in a normal operation state of the machine 2 to detect an abnormal operation state of the machine 2 such as an operation state illustrated in FIGS. 4, 5, and 6. The objects detected within the current operation scene may be compared continuously with the expected objects or object constellation.

The objects may also be compared at specific time points in a control program of the machine 2 (e.g., before starting the working process of the machine 2).

The camera images received in act S1 may be generated by one or more cameras 5 monitoring a machine tool operation within a tool operation space 4 defined by an operation tool chamber 4. In act S1, camera images may be generated by a plurality of cameras 5 (e.g., three or more) that monitor the machine tool operation space from different points of view and supply the generated camera images representing the current operation scene to the operation scene analyzer OSA using the trained artificial intelligence module AIM for operation state detection.

Figure 8:
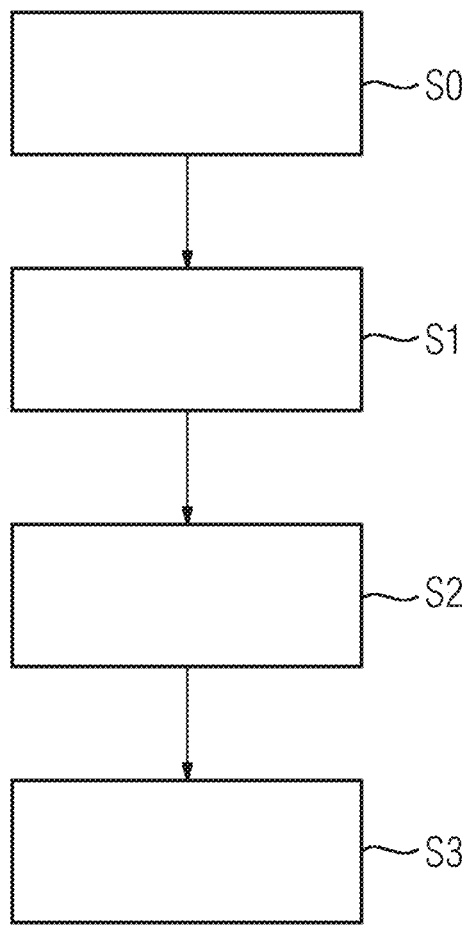
FIG. 8 shows a further flowchart for illustrating a further possible exemplary embodiment of a method for detection of an abnormal operation state of a machine.

FIG. 8 shows a further flowchart of a possible exemplary embodiment of a method. Acts S1, S2 are identical with the processing acts S1, S2 illustrated in FIG. 7. Before starting processing, the artificial intelligence module AIM may be trained in a training phase in act S0, as illustrated in FIG. 8. After training of the artificial intelligence module AIM has been completed, a detection process may be initiated by processing the received camera images in act S1. The camera images of the current operation scene of the machine tool 3 are processed by the operation scene analyzer OSA using the trained artificial intelligence module AIM to detect objects present within the current operation scene. In act S2, the detected physical objects may be compared continuously with expected objects in the operation scene in a normal operation state of the machine to detect an abnormal operation state of the machine 2. In a further act S3, the machine 2 may be controlled automatically depending on the detected operation state of the machine 2. If the detected operation state is a normal operation state of the machine 2, the processing of the workpiece 6 by the machine tool 3 is performed and continued under process of the executed numerical control program. In contrast, if the detected operation state forms an abnormal operation state, associated countermeasures or mitigating measures are performed by the machine 2 to reduce the negative impact on the production process. In a possible embodiment, the local controller 8 of the machine 2 may control one or several (e.g., three or more) actuators depending on the detected normal current operation state. For instance, the local controller 8 of the machine 2 may control the movement of the machine tool 3 and/or the movement of the workpiece 6 to avoid, for example, a collision between the machine tool 3 and the workpiece 6. Further, the controller 8 of the machine 2 may also stop the machine 2, if necessary. In a possible embodiment, the countermeasure proposed by the operation scene analyzer OSA may be displayed to an operator or user via a graphical human-machine interface so that the operator has the possibility to override a countermeasure proposed by the apparatus 1. However, if the detected abnormal operation state is critical and there is not sufficient time for informing an operator, the countermeasure may be initiated immediately in real time by the apparatus 1.

With the method and apparatus according to the present embodiments, it is possible to detect alien workpieces, incorrect workpieces, or an incorrect alignment of the workpieces in a working area or working space of the machine tool. Accordingly, damages due to a collision between the machine tool 3 and displaced or wrong objects may be avoided. This may result in a reduction of maintenance costs and using a number of required replacement spare parts. In addition, if a wrong raw working piece is mounted or if the working piece is mounted at a wrong location, this may result in a product that is not produced according to the predefined specification, so that production time is lost or the produced working piece has to be recalled at a later stage. In the illustrated embodiment of FIG. 2, a camera system including one or several (e.g., three or more) cameras 5 may be used to observe the working area of the machine tool 3. In a possible embodiment, the system 1 has access to virtual 3D models or workpieces (e.g., via connection to a design and/or engineering tool like NX). The artificial intelligence based operation scene analyzer OSA is used to detect operation states of the machine 2. The method and system according to the present embodiments may be used to increase safety as well as operational efficiency of the manufacturing facility. The method according to one or more of the present embodiments may be implemented as an online service for a production facility. In this implementation, the apparatus 1 may be used to control a remote production machine 2 via a network using camera images taken by cameras 5 at the remote site of the respective machine 2. In this embodiment, the image cameras 5 as well as the local controller 8 of the remote machine may be connected by a data network to the apparatus 1, as shown in FIGS. 1 and 2. In an alternative embodiment, the apparatus 1 may also be integrated in a production machine 2. In a possible embodiment, the artificial intelligence module AIM of the recognition and control apparatus 1 shown in FIG. 2 may be trained in a possible embodiment by a remote training system 9 via a separate data network connecting the model builder entity 11 with the artificial intelligence module AIM of the apparatus 1.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for detection of an abnormal state of a machine comprising a machine tool, the method comprising:
receiving camera images of a current operation scene of the machine tool by an operation scene analyzer using a trained artificial intelligence module, such that objects present within the current operation scene are detected; and
comparing continuously or at specific time points, by a control program, the objects detected within the current operation scene with objects expected in an operation scene in a normal operation state of the machine, such that an abnormal operation state of the machine is detected,
wherein the artificial intelligence module is trained with a dataset of operation scene images tagged with a normal operation state of the machine and a plurality of different abnormal operation states of the machine,
wherein the operation scene images are generated by rendering three-dimensional models into empty operation scene images showing an empty machine operation space; and
wherein the plurality of different abnormal operation states of the machine includes an abnormal operation state of the machine including an unidentified workpiece to be processed by the machine tool and an abnormal operation state of the machine including a wrong relative position between the machine tool and a workpiece within the operation space.

2. The method of claim 1, wherein the machine is automatically controlled by a machine controller depending on the detected operation state of the machine.

3. The method of claim 1, further comprising generating the camera images by at least one camera, the generating of the camera images comprising monitoring, by the at least one camera, a machine tool operation within a tool operation space,
wherein the machine tool of the machine is operated under control of a machine controller.

4. The method of claim 3, wherein the at least one camera comprises a plurality of cameras, and
wherein monitoring the machine tool operation within the tool operation space comprises monitoring, by the plurality of cameras, the machine tool operation space from different points of view and supplying the generated camera images representing a current operation scene to the operation scene analyzer using the trained artificial intelligence module for operation state detection.

5. The method of claim 1, wherein the plurality of different operation states of the machine further comprise an abnormal operation state of the machine including a presence of at least one unidentified object within the operation space.

6. The method of claim 1, wherein the operation scene images used to train the artificial intelligence module are read from an image database and supplied to a model builder entity that trains the artificial intelligence module used by the operation scene analyzer.

7. The method of claim 1, wherein the trained artificial intelligence module comprises a trained neural network including a deep convolutional neural network or a recurrent neural network.

8. The method of claim 1, wherein the artificial intelligence module comprises a decision tree, a random forest, a support vector machine, or any combination thereof.

9. The method of claim 1, wherein the objects expected in the operation scene during the normal operation state of the machine are derived using a CAD model, a CAM program stored in a memory, or a combination thereof.

10. The method of claim 1, further comprising:
retrieving, by an image generator, a three-dimensional model for each potential workpiece, for each potential object, or for each potential workpiece and each potential object prior to the operation of the machine; and
rendering the retrieved three-dimensional models into the empty operation scene images read from an image database that stores the empty operation scene images showing the empty machine operation space to generate the operation scene images, such that the generated operation scene images are provided for different operation scenes used by a model builder entity to train the artificial intelligence module.

11. The method of claim 1, wherein the machine is controlled to perform automatically mitigating actions, countermeasures, or automatically mitigating actions and countermeasures when the abnormal operation state of the machine is detected.

12. An object recognition apparatus for automatic detection of an abnormal operation state of a machine, the machine comprising a machine tool operable in an operation space monitored by at least one camera configured to generate camera images of a current operation scene, the object recognition apparatus comprising:
a processor configured to:
receive the generated camera images of the current operation scene;
detect objects present within the current operation scene, the detection of the objects present within the current operation scene comprising analysis of the current operation scene using a trained artificial intelligence module; and
detect an abnormal operation state of the machine, the detection of the abnormal operation state of the machine comprising comparison of the detected objects with objects expected in an operation scene in a normal operation state of the machine,
wherein the artificial intelligence module is trained with a dataset of operation scene images tagged with a normal operation state of the machine and a plurality of different abnormal operation states of the machine,
wherein the operation scene images are generated by rendering three-dimensional models into empty operation scene images showing an empty machine operation space; and
wherein the plurality of different abnormal operation states of the machine includes an abnormal operation state of the machine including an unidentified workpiece to be processed by the machine tool and an abnormal operation state of the machine including a wrong relative position between the machine tool and a workpiece within the operation space.

13. The object recognition apparatus of claim 12, further comprising a machine controller configured to control the machine in response to the detected operation state of the machine.

14. The object recognition apparatus of claim 12, wherein the machine tool is operated under control of a machine controller in a closed operation chamber defining the operation space monitored by the at least one camera to process a workpiece within the operation chamber.

15. The object recognition apparatus of claim 14, wherein the machine controller is configured to control the machine tool in response to the detected operation state of the machine.

* * * * *